United States Patent
Suk et al.

(10) Patent No.: US 9,031,774 B2
(45) Date of Patent: May 12, 2015

(54) APPARATUS AND METHOD FOR PREVENTING COLLISION OF VEHICLE

(75) Inventors: Jung Hee Suk, Daejeon (KR); Ik Jae Chun, Daejeon (KR); Chun Gi Lyuh, Daejeon (KR); Soon Il Yeo, Daejeon (KR); Wook Jin Chung, Andong (KR); Jeong Hwan Lee, Daegu (KR); Jae Chang Shim, Andong (KR); Tae Moon Roh, Daejeon (KR)

(73) Assignees: Electronics and Telecommunications Research Institute, Daejeon (KR); Andong University Industry-Academic Cooperation Foundation, Andong (KR)

( * ) Notice: Subject to any disclaimer, the term of this patent is extended or adjusted under 35 U.S.C. 154(b) by 763 days.

(21) Appl. No.: 12/779,221

(22) Filed: May 13, 2010

(65) Prior Publication Data
US 2011/0144859 A1 Jun. 16, 2011

(30) Foreign Application Priority Data
Dec. 14, 2009 (KR) .................. 10-2009-0123928

(51) Int. Cl.
| | |
|---|---|
| *G05D 1/02* | (2006.01) |
| *B62D 15/02* | (2006.01) |
| *B60W 30/12* | (2006.01) |
| *B60W 30/18* | (2012.01) |
| *G06K 9/00* | (2006.01) |
| *G08G 1/16* | (2006.01) |

(52) U.S. Cl.
CPC ........... *B62D 15/0265* (2013.01); *B60W 30/12* (2013.01); *B60W 30/18163* (2013.01); *G06K 9/00798* (2013.01); *G08G 1/16* (2013.01); *G08G 1/167* (2013.01); *Y02T 10/84* (2013.01); *G06K 9/00805* (2013.01)

(58) Field of Classification Search
USPC ................................... 701/300–301
See application file for complete search history.

(56) References Cited

U.S. PATENT DOCUMENTS

| | | | | |
|---|---|---|---|---|
| 5,790,403 A | * | 8/1998 | Nakayama ..................... 701/28 |
| 5,983,161 A | * | 11/1999 | Lemelson et al. ............ 701/301 |
| 6,131,063 A | * | 10/2000 | Seki et al. ...................... 701/70 |
| 6,370,475 B1 | * | 4/2002 | Breed et al. ................... 701/301 |
| 6,405,132 B1 | * | 6/2002 | Breed et al. ................... 701/301 |
| 6,487,500 B2 | * | 11/2002 | Lemelson et al. ............ 701/301 |
| 6,768,944 B2 | * | 7/2004 | Breed et al. ................... 701/301 |
| 6,906,639 B2 | * | 6/2005 | Lemelson et al. ............ 340/903 |

(Continued)

FOREIGN PATENT DOCUMENTS

| | | |
|---|---|---|
| EP | 1 562 146 A2 | 8/2005 |
| JP | 11-213295 A | 8/1999 |
| JP | 2002-314989 A | 10/2002 |
| JP | 2006-123795 A | 5/2006 |
| JP | 2007-030848 A | 2/2007 |
| KR | 1019990025008 A | 4/1999 |
| KR | 1020070066663 A | 6/2007 |
| KR | 1020070105386 A | 10/2007 |

OTHER PUBLICATIONS

Sudan Xu et al., "An Efficient Method for Real-Time Broken Lane Tracking Using PHT and Least-Square Method," Journal of Korea Information Science Society, Aug. 2008, pp. 619-623, vol. 14, No. 6.

*Primary Examiner* — Sind Phongsvirajati (57) ABSTRACT

The present invention provides an apparatus and method for predicting a moving direction of another vehicle running on a carriageway adjacent to a user's vehicle using periodically acquired image information around the user's vehicle, and performing a control process of preventing collision of the user's vehicle when a moving direction of the user's vehicle crosses the moving direction of the other vehicle.

19 Claims, 8 Drawing Sheets

(56) References Cited

U.S. PATENT DOCUMENTS

| | | | |
|---|---|---|---|
| 7,145,441 B2 * | 12/2006 | Knoop et al. | 340/435 |
| 7,194,347 B2 * | 3/2007 | Harumoto et al. | 701/45 |
| 7,236,884 B2 * | 6/2007 | Matsumoto et al. | 701/300 |
| 7,295,925 B2 * | 11/2007 | Breed et al. | 701/301 |
| 7,610,121 B2 | 10/2009 | Nishira et al. | |
| 2002/0161524 A1 * | 10/2002 | Oexmann et al. | 701/301 |
| 2005/0162513 A1 * | 7/2005 | Chan | 348/118 |
| 2007/0021915 A1 * | 1/2007 | Breed et al. | 701/301 |
| 2008/0040004 A1 * | 2/2008 | Breed | 701/45 |
| 2008/0252482 A1 * | 10/2008 | Stopczynski | 340/903 |
| 2009/0143986 A1 | 6/2009 | Stein et al. | |

* cited by examiner

APPARATUS AND METHOD FOR PREVENTING COLLISION OF VEHICLE

CROSS-REFERENCE TO RELATED APPLICATION

This application claims the benefit of Korean Patent Application No. 10-2009-0123928, filed Dec. 14, 2009, the disclosure of which is hereby incorporated herein by reference in its entirety.

BACKGROUND

1. Field of the Invention

The present invention relates to an apparatus and method for safe driving of a vehicle, and more particularly, to an apparatus and method for preventing collision of a vehicle with another vehicle running on an adjacent carriageway.

2. Discussion of Related Art

Conventional methods of preventing collision of a vehicle include a method of preventing collision of a vehicle with another vehicle running on an adjacent carriageway when a user's vehicle is going to change into the adjacent carriageway. This method includes calculating a relative position and relative speed between the user's vehicle and the other vehicle running on the adjacent carriageway using front and rear radars, and controlling the user's vehicle to prevent collision thereof. While this method has an advantage of precisely measuring a relative distance from the other vehicle using a radar, since only distance information with the other vehicle is used without any information on moving directions of the user's vehicle and the other vehicle, it is insufficient to prevent collision of the user's vehicle with the other vehicle when changing lanes.

In addition, since this method uses only the relative distance and relative speed to the other vehicle, it is difficult to determine collision possibility when the vehicle alternately runs on straight and curved lanes. Further, since it is difficult to accurately discriminate a passing vehicle from running vehicles on the adjacent carriageways, it is also difficult to determine possibility of collision with the vehicles.

Therefore, in order to solve this problem, a method of employing sensors that can recognize carriageway information, running information, and running speed of the vehicle, has been developed. However, this method uses a large number of sensors to make a signal processing time longer and increase probability of errors.

Meanwhile, there is provided a method of installing a plurality of cameras at front and rear parts of a vehicle at predetermined intervals, extracting an image of a lane from images photographed by the plurality of cameras, detecting a lane image pattern on a road depending on movement of the vehicle, and outputting an alarm sound or message or reducing a running speed when it is detected that the vehicle has left a lane on the basis of the lane image pattern so that a driver can drive his/her vehicle more safely.

However, this method must use numerous complex mathematical functions to extract a curved lane or predict the curved lane. Even when the complex mathematical functions are used, a signal processing time and probability of errors may be increased.

As described above, since the conventional methods for preventing collision of a vehicle must use numerous sensors and complex mathematical functions, a signal processing time and probability of errors may be increased. That is, the conventional methods are not effective in preventing collision of a vehicle.

Therefore, a method of effectively preventing collision of a vehicle in a simple manner is required.

SUMMARY OF THE INVENTION

The present invention, therefore, solves the aforementioned problems associated with conventional apparatuses by providing an apparatus and method for effectively preventing collision of a vehicle in a simple manner.

Additional aspect and advantages of the present invention will be set forth in part in the description which follows and, in part, will be obvious from the description, or may be learned by practice of the invention.

According to one aspect of the present invention, an apparatus for preventing collision of a vehicle includes: an image data acquisition part for photographing an external image including a portion of a user's running vehicle, a painted lane at one or more sides of the user's vehicle, and another vehicle running on an adjacent carriageway, at predetermined time intervals, and acquiring external image data; an image recognition part for analyzing the external image data and recognizing the user's vehicle, the painted lane, and the other vehicle; a running information determination part for calculating spacing distances from the user's vehicle and the other vehicle to the painted lane on the basis of the recognized external image information, predicting a relative moving direction between the user's vehicle and the other vehicle, and determining whether an intersection point occurs in the relative moving direction between the user's vehicle and the other vehicle; and a controller for generating a control signal to control an external apparatus when the intersection point occurs in the relative moving direction between the user's vehicle and the other vehicle.

The running information determination part may write disposition information of the user's vehicle in the running carriageway and disposition information of the other vehicle in an adjacent carriageway on the basis of the calculated spacing distance, and predict a relative moving direction between the user's vehicle and the other vehicle with respect to the painted lane on the basis of the written disposition information.

The image data acquisition part may further acquire external image data including the painted lane in front or rear of the user's vehicle.

When two or more other vehicles run on the adjacent carriageway, the image recognition part may give specific numbers to the respective vehicles to discriminate the vehicles.

The running information determination part may calculate a distance from one position of a side surface of the user's vehicle to a position at which a straight line perpendicular to the side surface of the user's vehicle meets the painted lane as the spacing distance. Here, the running information determination part may calculate a relative moving direction of the user's vehicle on the basis of the at least two spacing distances calculated from the at least two external image information.

The running information determination part may separately calculate a distance from one position of a side surface of the user's vehicle to a position at which a straight line perpendicular to the side surface of the user's vehicle meets the painted lane as a first spacing distance, and distances from one position of a side surface of the user's vehicle to positions at which straight lines having angles $\pm\theta$ ($0°<\theta<90°$) with respect to the straight line perpendicular to the side surface of the user's vehicle meet the painted lane as second and third spacing distances. Here, the running information determination part may calculate a relative moving direction of the user's vehicle on the basis of the first to third spacing distances.

The running information determination part may determine whether the intersection point occurs within a predetermined distance.

The running information determination part may determine whether the intersection point occurs within a predetermined distance according to a current speed of the user's vehicle.

The controller may generate and output a control signal for controlling a steering apparatus or a speed controller. Here, the controller may further generate and output a sound or image signal for outputting an alarm message.

The controller may collect a running speed of the user's vehicle, a spacing distance between the user's vehicle and the other vehicle, and position information between the user's vehicle and the other vehicle with respect to the painted lane, and store the information in a black box.

The running information determination part may determine whether the user's vehicle has left a carriageway in which the user's vehicle is running; when the user's vehicle has left the carriageway, the image data acquisition part may acquire driver's state image data obtained by photographing a driver of the user's vehicle according to request of the controller; the image recognition part may analyze the driver's state image data to determine whether a driver of the user's vehicle is drowsy; and the controller may start a control for a cruise driving when the driver of the user's vehicle is drowsy.

The apparatus for preventing collision of a vehicle may further include a driver input part for receiving a signal to request cruise driving from the driver of the user's vehicle. Here, when the signal to request the cruise driving is input, the controller may start a control for cruise driving.

The controller may determine whether the user's vehicle is running on a center of the carriageway upon the start of a control for cruise driving, and generate and output a control signal for controlling a steering apparatus when the user's vehicle is not running on the center of the carriageway. Here, the controller may calculate a steering angle to move the user's vehicle to the center of the carriageway, and generate and output a control signal corresponding to the calculated steering angle. In addition, the controller may calculate the steering angle on the basis of the current running speed of the user's vehicle.

The controller may generate and output a sound or image signal to inform that the cruise driving has begun when the cruise driving control has begun.

According to another aspect of the present invention, a method of preventing collision of a vehicle includes: acquiring external image data including a portion of a user's vehicle running on a carriageway, a painted lane at one or more sides of the user's vehicle, and another vehicle running on an adjacent carriageway, at predetermined time intervals; analyzing the external image data, and recognizing the user's vehicle, the painted lane and the other vehicle; calculating spacing distances from the user's vehicle and the other vehicle to the painted lane on the basis of the recognized external image information; writing disposition information of the user's vehicle in the carriageway and disposition information of the other vehicle in the adjacent carriageway on the basis of the calculated spacing distances; calculating a relative moving direction between the user's vehicle and the other vehicle with respect to the painted lane on the basis of the written disposition information; determining whether an intersection point occurs in the relative moving direction between the user's vehicle and the other vehicle; and generating and outputting a control signal for controlling an external apparatus when the intersection point occurs.

BRIEF DESCRIPTION OF THE DRAWINGS

The above and other features of the present invention will be described in reference to certain exemplary embodiments thereof with reference to the attached drawings in which.

DETAILED DESCRIPTION OF PREFERRED EMBODIMENTS

The objects, features, and advantages of the present invention will be apparent from the following detailed description of embodiments of the invention with references to the following drawings. Descriptions of well-known components and processing techniques are omitted so as not to unnecessarily obscure the embodiments of the present invention. The following terms are defined in consideration of functions of the present invention and may be changed according to users or operator's intentions or customs. Thus, the terms shall be defined based on the contents described throughout the specification.

As described above, a conventional method of preventing collision of a vehicle requires use of numerous sensors and calculation of complex mathematical functions. Use of the numerous sensors and calculation of the complex mechanical functions delay signal processing and increase probability of errors to make it difficult to effectively prevent collision of a vehicle.

Therefore, in order to solve this problem, the present invention provides an apparatus and method for predicting a moving direction of another vehicle running on a carriageway adjacent to a user's vehicle using periodically acquired image information around the user's vehicle, and performing a control process of preventing collision of the user's vehicle when a moving direction of the user's vehicle crosses the moving direction of the other vehicle.

Hereinafter, an exemplary embodiment of the present invention will be described with reference to the accompanying drawings.

For the convenience of description, hereinafter, a line painted with a color such as white, yellow, blue, etc., on a road in order to discriminate a running space of a vehicle is referred to as a 'painted lane', and a space for running a vehicle between the adjacent two painted lanes is referred to as a 'carriageway'.

Figure 1:
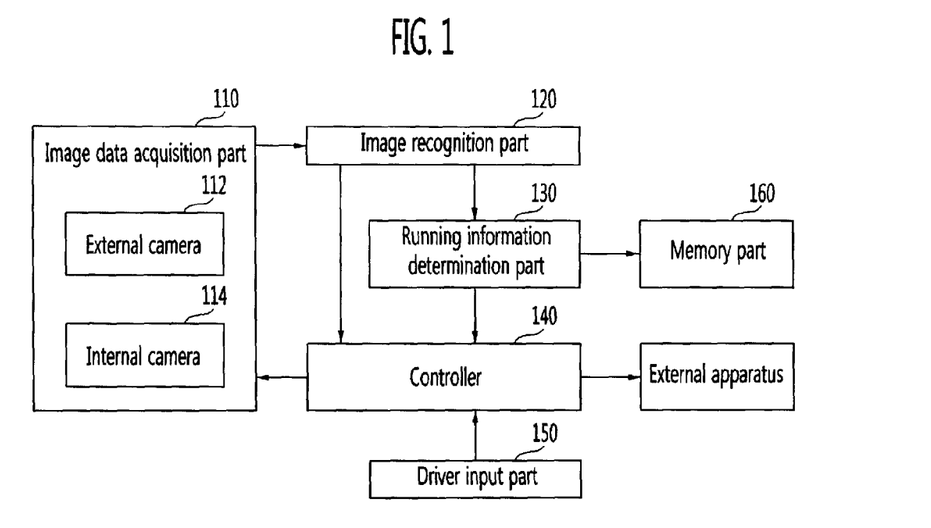
FIG. 1 is a block diagram of an apparatus for preventing collision of a vehicle in accordance with an exemplary embodiment of the present invention.

FIG. 1 is a block diagram of an apparatus for preventing collision of a vehicle in accordance with an exemplary embodiment of the present invention.

Referring to FIG. 1, an apparatus for preventing collision of a vehicle in accordance with an exemplary embodiment of the present invention includes an image data acquisition part 110, an image recognition part 120, a running information determination part 130, a controller 140, a driver input part 150, and a memory part 160.

The image data acquisition part 110 includes an external camera 112 installed outside a user's vehicle, and an internal camera 114 installed inside the user's vehicle.

The image data acquisition part 110 photographs an image including at least one painted lane of the user's vehicle using the external camera installed outside the user's vehicle to generate external image data, and then, outputs the generated external image data through the image recognition part 120.

The external image data may be image data including a portion of the user's vehicle, a painted lane, and a portion of another vehicle running on the adjacent carriageway.

The image data acquisition part 110 may photograph surroundings of the user's vehicle at predetermined time intervals, or may photograph surroundings of the user's vehicle at variable time intervals depending on a running speed of the user's vehicle. For example, when the running speed of the user's vehicle is gradually increased, it is possible to increase the number of external image data generated by each time unit by increasing a photographing speed. Here, the running speed of the user's vehicle may be input from a speedometer, etc., installed at the user's vehicle.

Meanwhile, the external camera 112 may be installed at any one surface of front, side and rear surfaces of the user's vehicle, preferably, the side surface of the user's vehicle.

This is because a leading or following vehicle may hide the painted lane upon changing lanes when the external camera 112 is installed on the front or rear surface of the user's vehicle, the painted lane may disappear from a photographing range of the external camera 112 when the user's vehicle enters a downhill stretch after passing an uphill stretch, and the painted lane may disappear from the photographing range of the external camera 112 when the user's vehicle rides over obstacles such as speed bumps.

Meanwhile, when the external cameras 112 are installed at two or more surfaces of the front, side and rear surfaces of the vehicle, the image data acquisition part 110 can group external image data photographed at the same time as one group and provide an identification number in consideration of positions at which the external cameras 112 are installed.

Figure 2A:
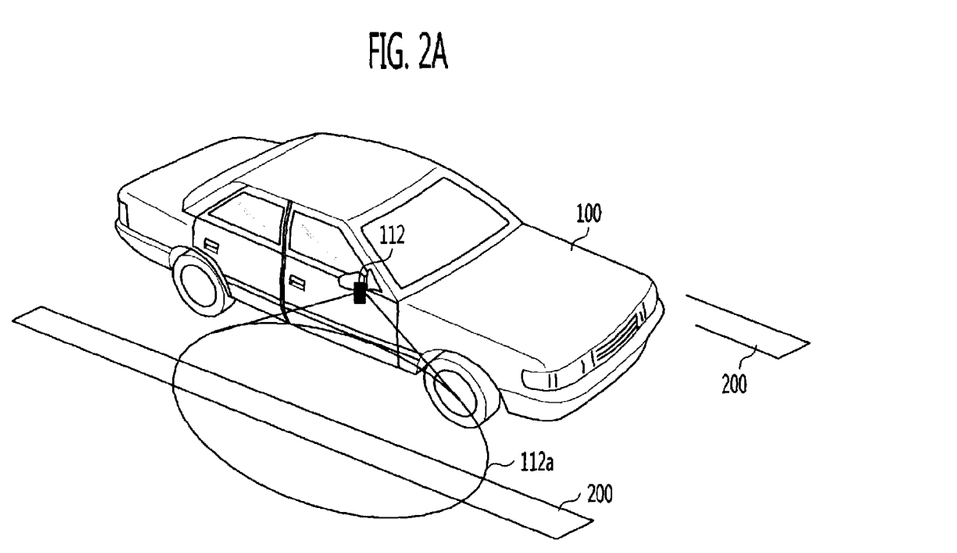
FIGS. 2A and 2B are views showing external cameras installed outside a vehicle to obtain external image data and photographing regions of the external cameras in accordance with an exemplary embodiment of the present invention.
Figure 2B:
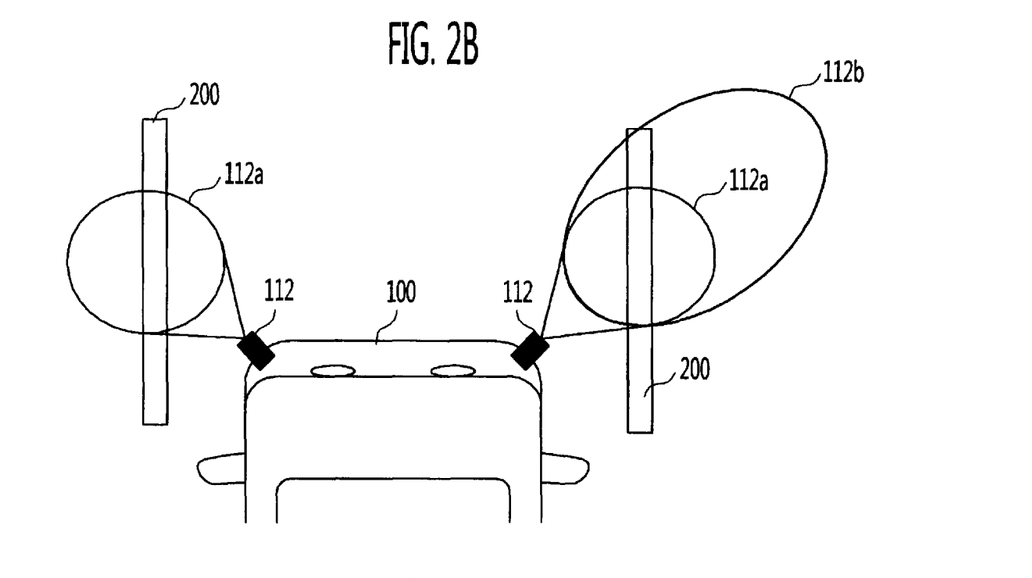

The installation positions and photographing regions of the external cameras 112 are shown in FIGS. 2A and 2B.

FIGS. 2A and 2B are views showing external cameras installed outside a vehicle to obtain external image data and photographing regions of the external cameras in accordance with an exemplary embodiment of the present invention.

FIG. 2A shows the external cameras 112 installed at side surfaces, in particular, in side mirrors of the user's vehicle 100, and FIG. 2B shows the external cameras 112 installed at a front surface, in particular, in headlights of the user's vehicle 100. Of course, the positions of the cameras may vary depending on a driver's or a designer's intension.

Referring to FIGS. 2A and 2B, the photographing regions 112a of the external cameras 112 include a portion of the user's vehicle 100, and the painted lane 200 of the carriageway in which the user's vehicle is running. While the photographing regions 112a may include another vehicle running on the adjacent carriageway, the other vehicle is omitted for the convenience of description.

Meanwhile, FIG. 2B shows an enlarged photographing region 112b, which may be enlarged as shown in FIG. 2B by adjusting an installation angle of the external camera 112 or using a lens, etc.

Returning to FIG. 1, the image data acquisition part 110 photographs a driver, in particular, a driver's face, using the internal camera 114 installed in the user's vehicle to generate a driver's state image data, and then, outputs the driver's state image data to the image recognition part 120.

The driver's state image data are used to check sleepiness of the driver to control the user's vehicle, which may be generated at predetermined time intervals or may be generated upon requests from the controller 140.

The image recognition part 120 receives external image data output from the image data acquisition part 110, recognizes the user's vehicle, the painted lane and the other vehicle running on the adjacent carriageway from the received external image data using an edge detection algorithm, etc., and outputs the recognized results to the running information determination part 130.

Meanwhile, when at least two vehicles run on the adjacent carriageways, the image acquisition part 120 automatically gives specific numbers to the vehicles. Here, the moving direction and speed of an image blob may be discriminated from the recognized images to give the specific numbers through an image labeling technique.

In addition, the image acquisition part 120 analyzes the external image data to recognize a specific position of the user's vehicle. The specific position of the user's vehicle is an arbitrary position of the user's vehicle existing in the photographing region of the external camera, which may be a position of the tire of the user's vehicle in contact with a road surface or a peripheral position of the user's vehicle just vertically under the camera. This position may vary depending on a system designer's intention.

Meanwhile, the image recognition part 120 can separately divide a region adjacent to the user's vehicle 100 from a front wide region. That is, the image recognition part 120 can discriminate regions adjacent to and far from the user's vehicle 100 on the basis of a distance from the user's vehicle, and generate information to determine whether a predicted collision position of the vehicle is urgent.

Further, the image recognition part 120 analyzes the driver's state image date received from the image data acquisition part 110 to determine whether the driver is drowsy or not, and outputs the determination results to the controller 140 when it is determined that the driver is drowsy.

Here, a support vector machine (SVM), an adaboost algorithm, or the like, may be used to analyze the driver's state image data.

The running information determination part 130 receives the image-recognized results output from the image recognition part 120 to calculate a spacing distance between the user's vehicle and the painted lane and a spacing distance between the other vehicle and the painted lane, and writes disposition information of the user's vehicle in the running carriageway and disposition information of the other vehicle running on the adjacent carriageway.

When the disposition information of the user's vehicle is written, the disposition information may be written using a spacing distance from the painted lane of one side of the user's vehicle, or may be written by obtaining a spacing distance from both painted lanes.

Furthermore, the spacing distance between the user's vehicle and the painted lane may be obtained by calculating a spacing distance between a specific position of the user's vehicle and the painted lane.

Hereinafter, the method of calculating the spacing distance and the method of writing the disposition information of the user's vehicle will be described with reference to FIGS. 3A to 3E and 4.

FIGS. 3A to 3E are views for explaining a method of calculating a spacing distance of a vehicle from a painted lane in accordance with an exemplary embodiment of the present invention.

Figure 3A:
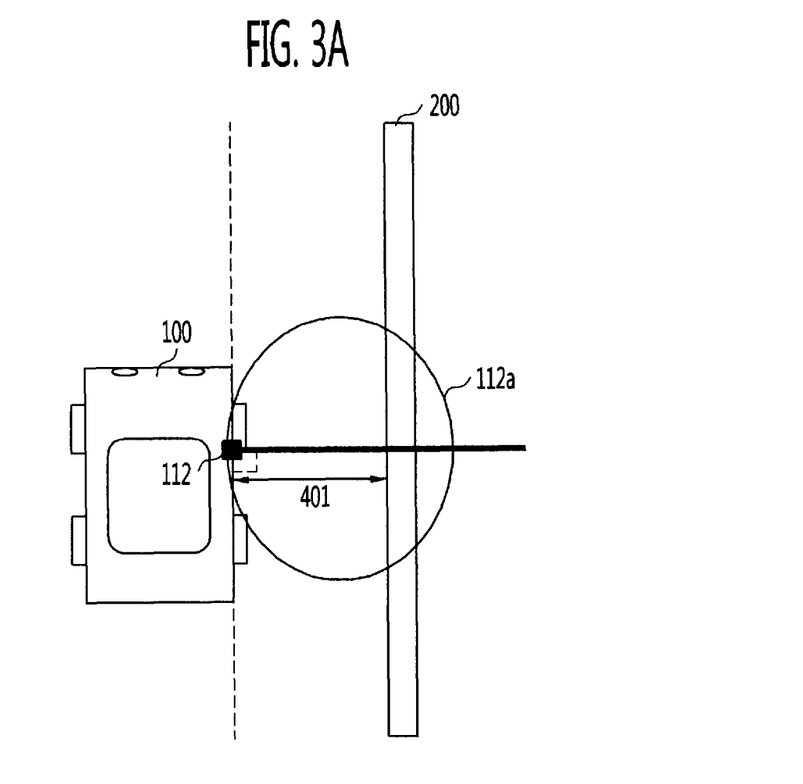
FIGS. 3A to 3E are views for explaining a method of calculating a distance of a vehicle from a painted lane in accordance with an exemplary embodiment of the present invention.
Figure 3B:
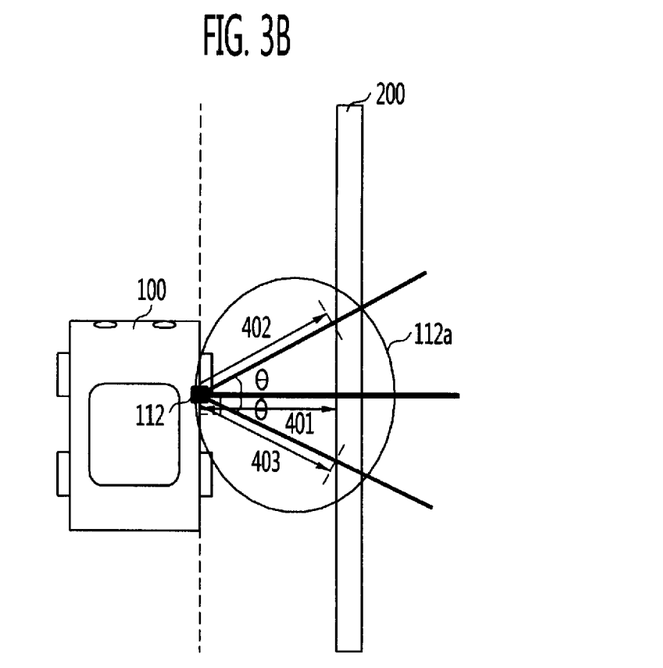
Figure 3C:
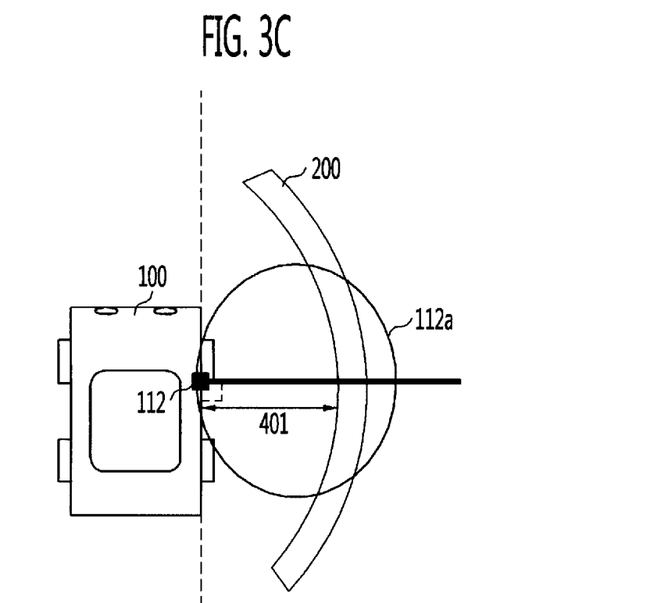
Figure 3D:
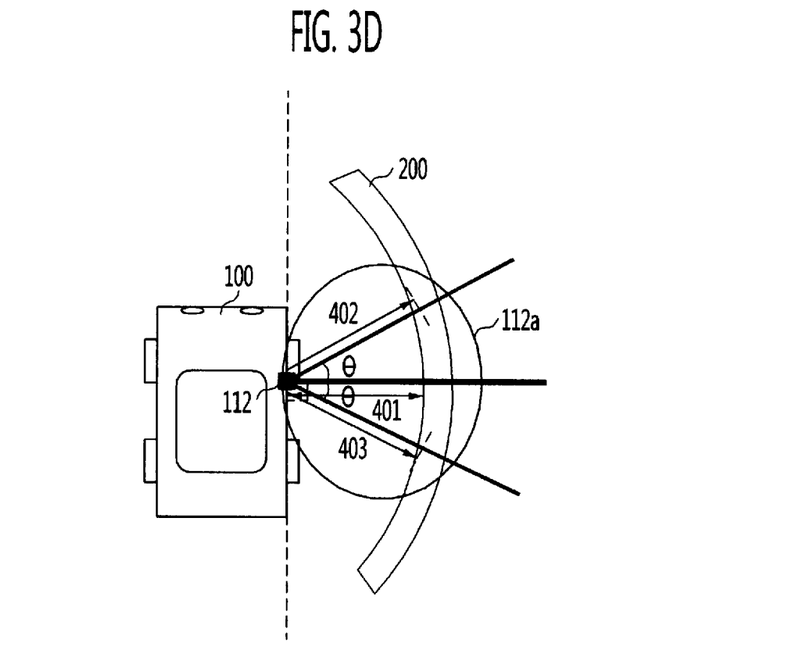

FIGS. 3A and 3B show a case in which the user's vehicle runs on a straight road, and FIGS. 3C and 3D show a case in which the user's vehicle runs on a curved road.

FIGS. 3A and 3C shows that a spacing distance 401 is calculated by a distance from a specific position of a side surface of the user's vehicle 100 to a position at which a straight line perpendicular to the side surface of the user's vehicle 100 meets the painted lane 200.

Meanwhile, FIGS. 3B and 3D show that a first spacing distance 401 is calculated by a distance from a specific position of the side surface of the user's vehicle 100 to a position at which a straight line perpendicular to the side surface of the user's vehicle 100 meets the painted lane 200, and second and third spacing distances 402 and 403 are calculated by a distance from a specific position of the side surface of the user's vehicle 100 to positions at which straight lines having angles $\pm\theta$ ($0°<\theta<90°$) with respect to the straight line perpendicular to the side surface of the user's vehicle 100 meet the painted lane 200.

In order to obtain the spacing distances of FIGS. 3B and 3D, a relative disposition state between the user's vehicle 100 and the painted lane 200 can be more accurately detected in a case in which a distance from a specific position of the user's vehicle 100 to the painted lane 200 is obtained using at least three intersection points than a case in which the distance can be obtained using one intersection point described with reference to FIGS. 3A and 3C.

In addition, when the spacing distance is obtained using at least three intersection points as shown in FIGS. 3B and 3D, the relative disposition status between the user's vehicle 100 and the painted lane 200 can be recognized even when single external image information is used, and it is possible to determine whether a carriageway in which the user's vehicle 100 runs is a straight carriageway or a curved carriageway, or to calculate an inclination angle of the user's vehicle 100 in the straight carriageway when the user's vehicle 100 runs on the straight carriageway.

Figure 3E:
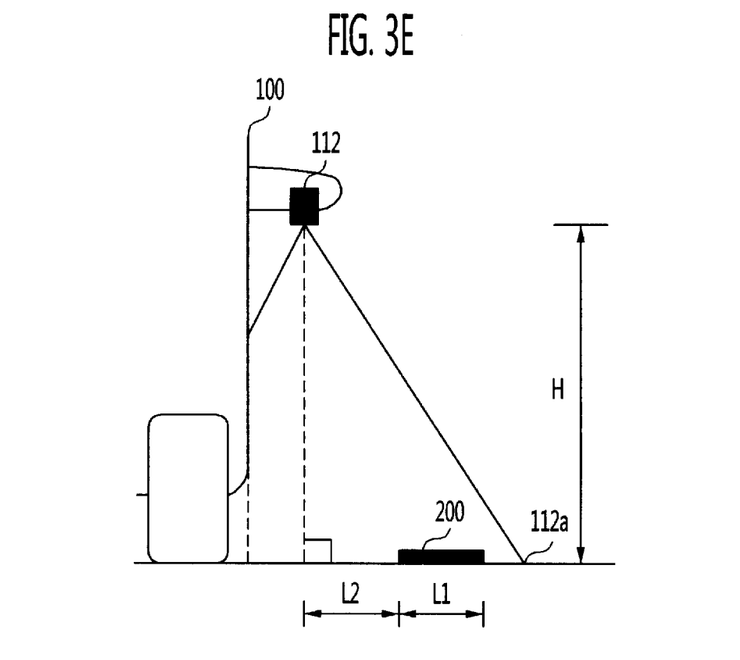

Meanwhile, FIG. 3E is a vertical cross-sectional view of a photographing region of the external camera 112 when seen from a rear part of the user's vehicle. Referring to FIG. 3E, a vertical distance between the external camera 112 and the carriageway may be represented as H, a width of the painted lane 200 may be represented as L1, and a distance from a specific position of the user's vehicle 100 to the painted lane 200 may be represented as L2. For the convenience of description, FIG. 3E shows that a position at which a vertical line from the external line 112 meets a road surface is set as a specific position of the user's vehicle, and the spacing distance is calculated.

Figure 4:
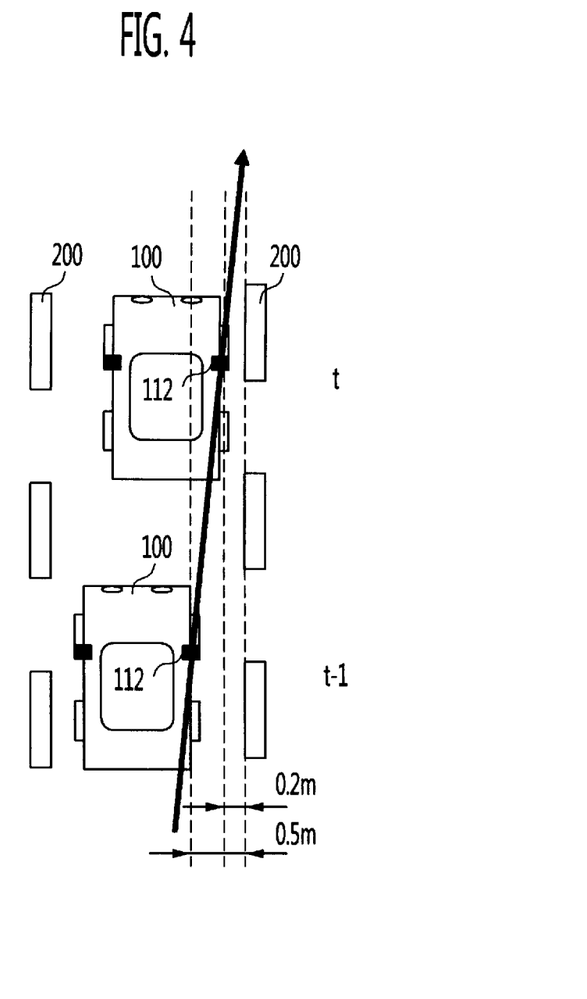
FIG. 4 is a view showing disposition information of the vehicle drafted in accordance with an exemplary embodiment of the present invention.

FIG. 4 is a view showing disposition information of the vehicle drafted in accordance with an exemplary embodiment of the present invention.

Referring to FIG. 4, it will be appreciated that a spacing distance from a specific position of the user's vehicle to the painted lane, which is calculated at a time t-1, is 0.5 m, and a spacing distance from a specific position of the user's vehicle to the painted lane, which is calculated at a time t, is 0.2 m.

The running information determination part 130 can write disposition information of the user's vehicle on the basis of the spacing distance between the user's vehicle and the painted lane calculated by analyzing the external image information. While not shown, disposition information of another vehicle can be written by the same method.

Returning to FIG. 1, the running information determination part 130 predicts a relative moving direction of the user's vehicle on the basis of the disposition information of the user's vehicle as shown in FIG. 4, and predicts a relative moving direction of the other vehicle on the basis of disposition information of the other vehicle.

That is, a relative moving direction 501 of the user's vehicle on the painted lane can be predicted by straightly connecting a position of the user's vehicle calculated at the time t-1 to a position of the user's vehicle calculated at the time t and calculating an angle at which the straight line meets the painted lane. Prediction of a relative moving direction of the other vehicle is performed through the same method.

The running information determination part 130 determines whether an intersection point occurs in relative moving directions of the user's vehicle and the other vehicle, and outputs the intersection point information to the controller 140 when the intersection point occurs.

Meanwhile, it is possible to determine whether the intersection point occurs within a predetermined distance. Since it is impossible for the user's vehicle to run parallel to the other vehicle running on the adjacent carriageway, it is needed to determine whether the intersection point occurs within a predetermined distance only. In addition, it is also possible to determine whether an intersection point occurs within a predetermined distance according to a running speed of the user's vehicle. For example, it is possible to determine whether an intersection point occurs with reference to a farther distance when a running speed of the vehicle is faster, and it is possible to determine whether an intersection point occurs with reference to a nearer distance when a running speed of the vehicle is slower.

The controller 140 receives information about generation of the intersection point from the running information determination part 130, and generates and outputs a control signal to control external apparatuses such as a speed controller, a steering controller, a safety controller, and so on. In addition, the controller 140 may generate and output a control signal to output an alarm message to provide an alarm to a driver. The alarm message may be output through a sound or image. Here, the alarm message may be output in a stepwise manner according to the level of hazard. At this time, it is possible to determine the level of hazard on the basis of a current running speed, a distance from the other vehicle, a distance from an intersection point, and so on.

The control signal output from the controller 140 may be used to control a speed controller such as an engine, a transmission, a brake, etc., to control a steering apparatus such as a steering wheel, etc., or to control a safety apparatus such as a safety belt, an airbag, etc.

In addition, the controller 140 may collect relative position information, etc., of the user's vehicle and the other vehicle and store the relative position information, etc, in a black box (not shown) on the basis of a running speed of the user's vehicle, a distance between the user's vehicle and the other vehicle, or relative position information of the user's vehicle and the other vehicle with respect to the painted lane, when collision between the user's vehicle and the other vehicle is predicted according to a signal input from the running information determination part 130. The black box may be installed in a vehicle, and storage of information in the black box may be continuously performed for a certain period from a time in which collision of a vehicle is predicted. The information stored in the black box may be used to verify causes of an accident, etc.

Meanwhile, the controller 140 generates a control signal corresponding to a signal input from the driver input part 150. In particular, when a signal for requesting cruise driving start is input through the driver input part 150, the controller 140 outputs a signal for requesting acquisition of user state image data to the image data acquisition part 110, and performs a control to begin cruise driving when it is determined that cruise driving is needed.

The driver input part 150 outputs the signal input through keys or voices from a user to the controller 140. For example, when a driver operates keys to request cruise driving, the driver input part 150 generates a signal corresponding to the key input to output the signal to the controller 140.

The memory part 160 stores data used in the respective components, outputs data stored by requests of the respective components, and may further include a separate auxiliary storage apparatus.

Hereinafter, a method of preventing collision of a vehicle using the apparatus for preventing collision of a vehicle in accordance with an exemplary embodiment of the present invention will be described.

Figure 5:
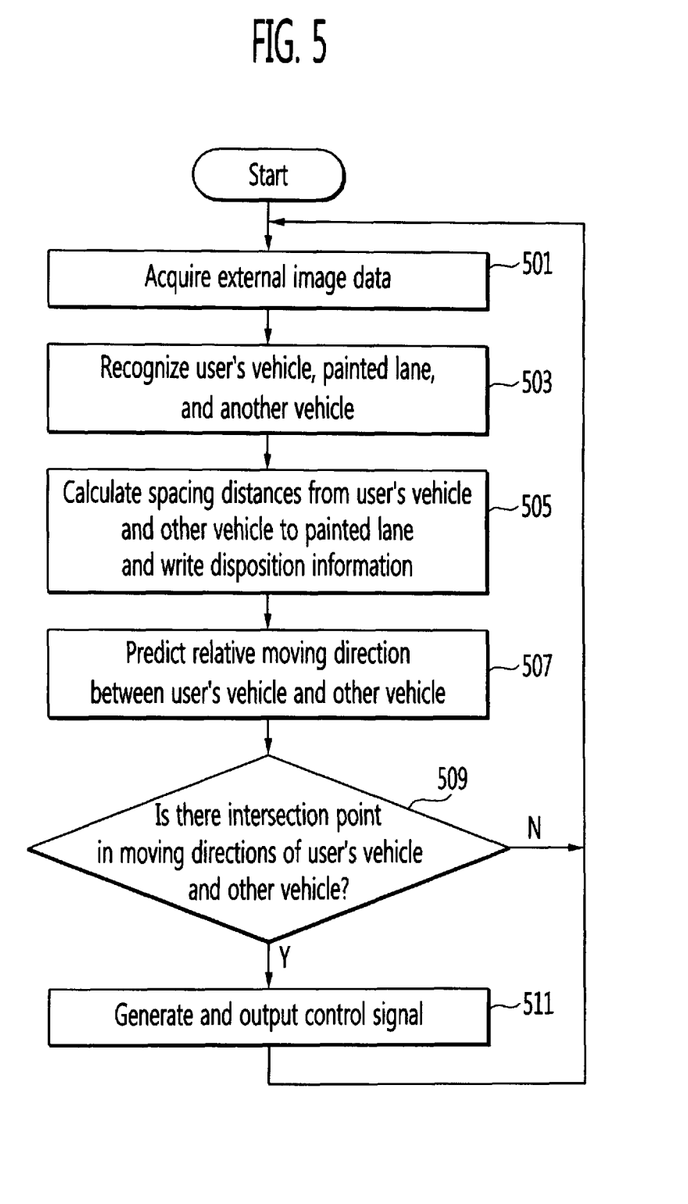
FIG. 5 is a flowchart showing a method of preventing collision of a vehicle in accordance with an exemplary embodiment of the present invention.

FIG. 5 is a flowchart showing a method of preventing collision of a vehicle in accordance with an exemplary embodiment of the present invention. Hereinafter, the method of preventing collision of a vehicle in accordance with an exemplary embodiment of the present invention will be described with reference to FIG. 5.

In operation S501, the image data acquisition part 110 photographs images including the painted lane of at least one side of the user's vehicle using the external camera 112 to obtain external image data, and then, outputs the obtained external image data to the image recognition part 120. The external image data may include a portion of the user's vehicle, the painted lane, and a portion of another vehicle running on an adjacent carriageway.

In operation S503, the image recognition part 120 receives external image data output from the image data acquisition part 110, recognizes the user's vehicle, the painted lane and the other vehicle running on the adjacent carriageway from the external image data using an edge detection algorithm, etc., and outputs the recognized results to the running information determination part 130.

Here, when at least two other vehicles are running on the adjacent carriageway, the image recognition part 120 gives specific numbers to the respective vehicles.

In operation S505, the running information determination part 130 receives the image-recognized results output from the image recognition part 120 to calculate a spacing distance between the user's vehicle and the painted lane and a spacing distance between the other vehicle and the painted lane, and writes disposition information of the user's vehicle in the running carriageway and disposition information of the other vehicle running on the adjacent carriageway.

At this time, if there is no vehicle in the image recognition results, the spacing distance between the other vehicle and the painted lane may not be calculated, and disposition information of the other vehicle may not be written.

In operation S507, the running information determination part 130 predicts a moving direction of the user's vehicle on the basis of the disposition information of the user's vehicle, and predicts a moving direction of the other vehicle on the basis of the disposition information of the other vehicle.

In operation S509, the running information determination part 130 determines whether an intersection point occurs in moving directions of the user's vehicle and the other vehicle, and outputs information about the intersection point when the intersection point occurs or returns to operation S501 when there is no intersection point.

Meanwhile, in determining whether the intersection point occurs, it is possible to determine whether the intersection point occurs within a predetermined distance.

In operation S511, the controller 140 receives information about generation of the intersection point from the running information determination part 130, generates a control signal for controlling external apparatuses such as a speed controller, a steering controller, a safety controller, and so on, to output it to the exterior, and returns to operation S501. Here, the controller 140 may further generate a control signal for outputting an alarm message for providing an alarm to a driver and output it to the exterior. The alarm message may be output through a sound or image. Here, the alarm message may be output in a stepwise manner according to the level of hazard. At this time, it is possible to determine the level of hazard on the basis of a current running speed, a distance from the other vehicle, a distance from an intersection point, and so on. In addition, the controller 140 may collect a running speed of the user's vehicle, a spacing distance between the user's vehicle and the other vehicle, relative position information between the user's vehicle and the other vehicle with respect to the painted lane, etc. and store them in the black box.

Meanwhile, the controller 140 may provide a collision alarm when the user's vehicle or the other vehicle violates the painted lane, which will be described with reference to FIG. 6.

Figure 6A:
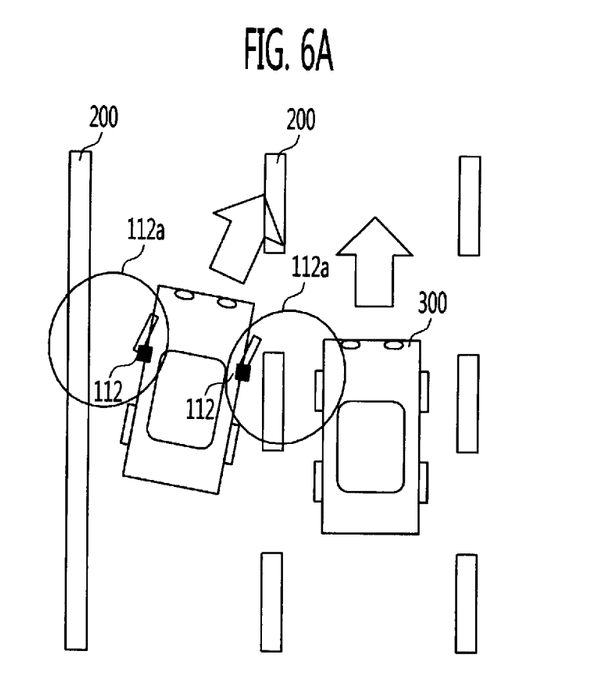
FIGS. 6A and 6B are views showing cases in which a user's vehicle and another vehicle violate a painted lane.
Figure 6B:
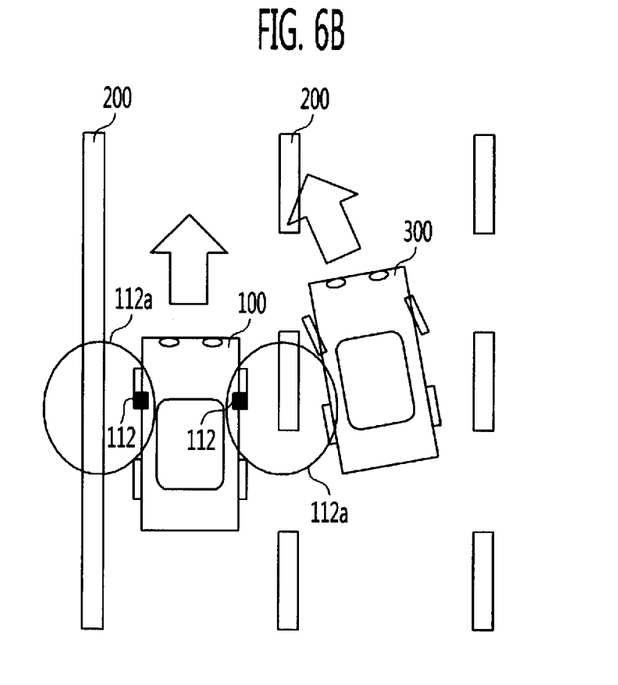

FIG. 6A is a view showing a case in which a user's vehicle violates a painted lane, and FIG. 6B is a view showing a case in which another vehicle violates a painted lane.

As shown in FIGS. 6A and 6B, the controller 140 may provide a collision alarm when any one vehicle violates the painted lane, or may determine whether an intersection point occurs in moving directions of the user's vehicle and the other vehicle as shown by arrows before a collision alarm and provide the collision alarm when the intersection point occurs. Here, it is possible to determine whether the intersection point occurs within a predetermined distance.

In addition, it is possible to classify levels of the alarms on the basis of running speeds of the user's vehicle and the other vehicle or a distance between the intersection point and the user's vehicle and provide the alarms in a stepwise manner.

Meanwhile, when the user's vehicle has left the carriageway to violate the painted lane, if a driver is drowsy, the controller 140 starts cruise driving of the user's vehicle for the purpose of safety. The cruise driving of the user's vehicle will be described with reference to FIG. 7.

Figure 7:
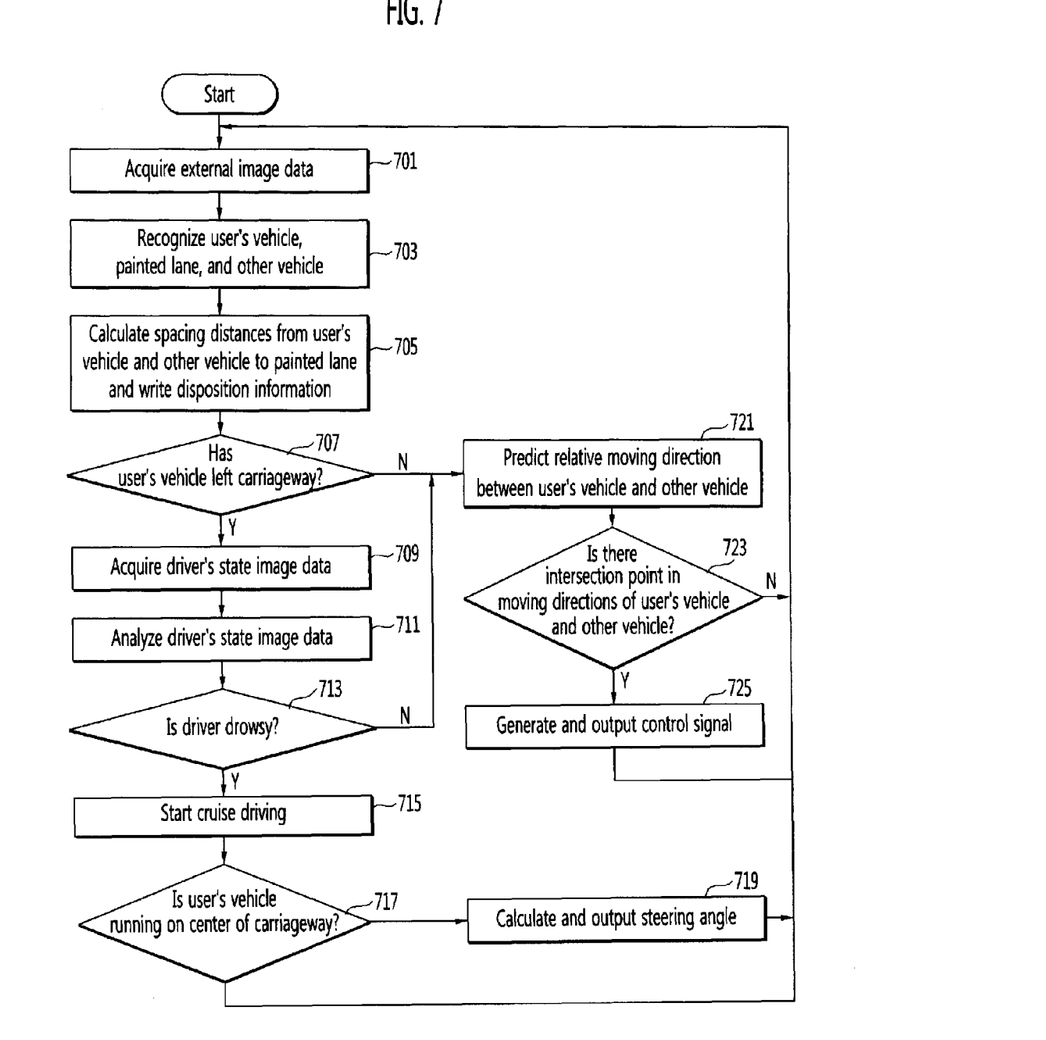
FIG. 7 is a flowchart showing a method of preventing collision of a vehicle in accordance with another exemplary embodiment of the present invention.

FIG. 7 is a flowchart showing a method of preventing collision of a vehicle in accordance with another exemplary embodiment of the present invention. Hereinafter, the method of preventing collision of a vehicle in accordance with another exemplary embodiment of the present invention will be described with reference to FIG. 7.

In operation S701, the image data acquisition part 110 photographs an image including at least one side of the user's vehicle and the painted lane using the external camera 112 to obtain external image data, and outputs the obtained external image data to the image recognition part 120. The external image data may include a portion of the user's vehicle, the painted lane, and a portion of another vehicle running on the adjacent carriageway.

In operation S703, the image recognition part 120 receives the external image data output from the image data acquisition part 110, recognizes the user's vehicle, the painted lane and the other vehicle running on the adjacent carriageway from the external image data using the edge detection algorithm, and outputs the recognized results to the running information determination part 130.

At this time, when two or more other vehicles run on the adjacent carriageway, the image recognition part 120 gives specific numbers to the respective vehicles.

In operation S705, the running information determination part 130 receives the image recognition results output from the image recognition part 120 to calculate a spacing distance between the user's vehicle and the painted lane and a spacing distance between the other vehicle and the painted lane, and writes disposition information of the user's vehicle in the running carriageway and disposition information of the other vehicle running on the adjacent carriageway.

At this time, if there is no vehicle found in the image recognition results, the spacing distance between the other vehicle and the painted lane may not be calculated, and the disposition information of the other vehicle may not be written.

In operation S707, the running information determination part 130 determines whether the user's vehicle has left the carriageway in which the user's vehicle is running, and performs operation S709 when the user's vehicle has left the running carriageway or performs operation S721 when the user's vehicle is running on the carriageway.

In operation S709, the image data acquisition part 110 acquires driver's state image data using the internal camera 114, and outputs the acquired driver's state image data to the image recognition part 120.

In operation S711, the image recognition part 120 analyzes the driver's state image data, and in operation S713, determines whether the driver is drowsy. When it is determined that the driver is drowsy, the controller 140 performs operation S715, and when the driver is not drowsy, performs operation S721.

In operation S715 performed according to the determination that the driver is drowsy, the controller 140 performs cruise driving. The cruise driving may be started by a user input signal for requesting that cruise driving begin through the user input part 150.

In operation S717, the controller 140 determines whether the user's vehicle is running on a center of the carriageway, and goes to operation S701 to continuously perform the image recognition when the user's vehicle is running on a center of the carriageway or goes to operation S719 when the user's vehicle is not running on the center of the carriageway.

In operation S719, the controller 140 calculates a steering angle to output it to a steering apparatus so that the user's vehicle can run on a center of the carriageway, and goes to operation S701. Here, the steering angle may be calculated in consideration of a current running speed of the user's vehicle.

Meanwhile, in operation S721 performed by the determination of operation 707 that the user's vehicle has not left the carriageway or the determination of operation S713 that the driver is not drowsy, the running information determination part 130 predicts a moving direction of the user's vehicle on the basis of disposition information of the user's vehicle, and predicts a moving direction of the other vehicle on the basis of disposition information of the other vehicle.

In operation S723, the running information determination part 130 determines whether an intersection point occurs in moving directions of the user's vehicle and the other vehicle, and outputs the information to the controller 140 when the intersection point occurs or goes to operation S701 when there is no intersection point.

Meanwhile, it is also possible to determine whether the intersection point occurs within a predetermined distance.

In operation S725, the controller 140 receives information about generation of the intersection point from the running information determination part 130 and generates at least one of a control signal for controlling external apparatuses such as a speed controller, a steering controller, a safety controller, and so on, and a control signal for outputting an alarm message for providing an alarm to a driver to output it to the exterior, and goes to operation S701 to continuously perform an operation for preventing collision of a vehicle.

As can be seen from the foregoing, it is possible to prevent collision of a vehicle using a simple method without numerous sensors or complex function calculation.

In addition, it is possible to determine whether a driver is drowsy when a user's vehicle has left a carriageway, and when the driver is drowsy, cruise driving can be performed to accomplish safe driving.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An apparatus for preventing collision of a vehicle, comprising:
    an image data acquisition part including at least one external camera installed outside a user's vehicle and configured to photograph surroundings of the user's vehicle to acquire external image data including images for portions of (i) the user's vehicle, (ii) a painted lane at one or more sides of the user's vehicle, and (iii) another vehicle running in an adjacent carriageway, at predetermined time intervals, and including an internal camera installed inside the user's vehicle and configured to photograph a driver of the user's vehicle to acquire driver state image data;
    an image recognition part configured to analyze the external image data and recognize (i) the user's vehicle, (ii) the painted lane, and (iii) the other vehicle;
    a running information determination part configured to calculate (i) a first distance between the user's vehicle and the painted lane and (ii) a second distance between the other vehicle and the painted lane on the basis of the recognized external image data, predict a running direction of the user's vehicle and a running direction of the other vehicle, and determine whether a collision point is expected based on the predicted running direction of the user's vehicle and the predicted running direction of the other vehicle,
        wherein the first distance between the user's vehicle and the painted lane is calculated as a distance from a specific position at a side surface of the user's vehicle to a position at which a straight line perpendicular to the side surface of the user's vehicle meets the painted lane, wherein the running information determination part is configured to determine whether the user's vehicle leaves the carriageway in which the user's vehicle is running, wherein when it is determined that the user's vehicle leaves the carriageway, the image data acquisition acquires the driver state image data using the internal camera in response to a request from a controller, wherein the image recognition part is configured to analyze the driver state image data to determine whether the driver of the user's vehicle is drowsy; and the controller configured to initiate a cruise driving mode on the user's vehicle when the running information determination part determines that the user's vehicle leaves the carriageway and when it is determined that the driver of the user's vehicle is drowsy.

2. The apparatus according to claim 1, wherein the running information determination part is configured to obtain (i) first disposition information of the user's vehicle in the carriageway on the basis of the first distance and (ii) second disposition information of the other vehicle in the adjacent carriageway on the basis of the second distance, and predict the running direction of the user's vehicle and the running direction of the other vehicle on the basis of the painted lane and the first and the second disposition information.

3. The apparatus according to claim 1, wherein the painted lane includes (i) a front lane in front of the user's vehicle or (ii) a rear lane in rear of the user's vehicle.

4. The apparatus according to claim 1, wherein, when there are two or more other vehicles in the adjacent carriageway, the image recognition part assigns numbers to the respective vehicles to distinguish the other vehicles from each other.

5. The apparatus according to claim 1, wherein the first distance is the shortest distance between a given point of the side surface of the user's vehicle and the painted lane.

6. The apparatus according to claim 5, wherein the running information determination part is configured to calculate the predicted running direction of the user's vehicle on the basis of the first distance detected at two or more points in time.

7. The apparatus according to claim 1,
wherein the running information determination part is configured to calculate (i) a first distance which is the shortest distance between a first given point on the side surface of the user's vehicle and the painted lane, and (iii) third and fourth distances between a second given point on the side surface of the user's vehicle and a first point and a second point on the painted lane, respectively, and wherein the third and the fourth distances each have angles ±θ(0°<θ<90°) with respect to the painted lane.

8. The apparatus according to claim 7, wherein the running information determination part is configured to calculate the predicted running direction of the user's vehicle on the basis of the first, the third, and the fourth distances.

9. The apparatus according to claim 1, wherein the running information determination part is configured to determine whether the collision point is expected within a predetermined distance.

10. The apparatus according to claim 1, wherein the running information determination part is configured to determine whether the collision point is expected within a predetermined distance at a current speed of the user's vehicle.

11. The apparatus according to claim 1, wherein the control signal is configured to control a steering apparatus or a speed controller of the user's vehicle.

12. The apparatus according to claim 11, wherein the controller is further configured to generate and output an alarm signal in a form of any of a sound signal and an image signal.

13. The apparatus according to claim 1, wherein the controller is configured to collect information including a speed of the user's vehicle, a distance between the user's vehicle and the other vehicle, and position information between the user's vehicle and the other vehicle with respect to the painted lane, and store the information in a black box.

14. The apparatus according to claim 1, the apparatus further comprising a driver input part configured to receive a cruise driving request from the driver of the user's vehicle, wherein, when the cruise driving request is received, the controller is configured to initiate a cruise driving mode.

15. The apparatus according to claim 1, wherein the controller is configured to determine whether the user's vehicle is in a center of the carriageway when the cruise driving mode is initiated, and generate and output a control signal for controlling a steering apparatus when the user's vehicle is not in the center of the carriageway.

16. The apparatus according to claim 15, wherein the controller is configured to calculate a steering angle to move the user's vehicle to the center of the carriageway, and generate and output a control signal corresponding to the calculated steering angle.

17. The apparatus according to claim 16, wherein the controller is configured to calculate the steering angle on the basis of a current speed of the user's vehicle.

18. The apparatus according to claim 1, wherein the controller is configured to generate and output a sound signal or an image signal to inform that the cruise driving mode has been initiated.

19. A method of preventing collision of a vehicle, comprising:

acquiring external image data, using an external camera installed outside a user's vehicle, the external image data including images for portions of (i) the user's vehicle running in a carriageway, (ii) a painted lane at one or more sides of the user's vehicle, and (iii) another vehicle running in an adjacent carriageway, at predetermined time intervals;

analyzing, by an image recognition part and a running information determination part, the external image data, and recognizing images of the user's vehicle, the painted lane, and the other vehicle based on the analyzed external image data;

calculating distances from the user's vehicle and the other vehicle to the painted lane on the basis of the recognized images;

obtaining disposition information of the user's vehicle in the carriageway and disposition information of the other vehicle in the adjacent carriageway on the basis of the calculated distances;

writing the disposition information of the user's vehicle and the disposition information of the other vehicle to a black box;

calculating a predicted running direction of the user's vehicle and a predicted running direction of the other vehicle with respect to the painted lane on the basis of the obtained disposition information;

determining whether a collision point is expected based on the predicted running direction of the user's vehicle and the predicted running direction of the other vehicle;

determining whether the user's vehicle leaves the carriageway in which the user's vehicle is running;

acquiring driver state image data by photographing, using an internal camera installed inside the user's vehicle, a driver of the user's vehicle when it is determined that the user's vehicle leaves the carriageway;

analyzing the driver state image data to determine whether the driver of the user's vehicle is drowsy; and generating and initiating a cruise driving mode on the user's vehicle when the running information determination part determines that the user's vehicle leaves the carriageway and when it is determined that the driver of the user's vehicle is drowsy.

\* \* \* \* \*